Feb. 14, 1956  G. STRECKER  2,734,389
CHANGE SPEED GEAR OF THE ADJUSTABLE ROTARY ROLLER TYPE
Filed Dec. 29, 1949  4 Sheets-Sheet 1

INVENTOR:
GERALD STRECKER
By Wenderoth, Lind
& Ponack
ATTORNEYS

Feb. 14, 1956 G. STRECKER 2,734,389
CHANGE SPEED GEAR OF THE ADJUSTABLE ROTARY ROLLER TYPE
Filed Dec. 29, 1949 4 Sheets-Sheet 2

INVENTOR:
GERALD STRECKER
By Wenderoth, Lind
& Ponack
ATTORNEYS

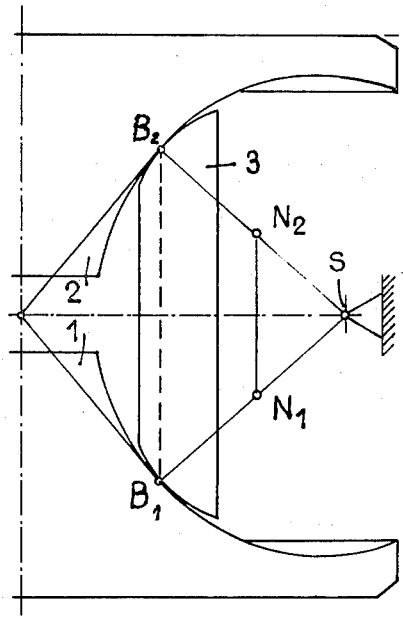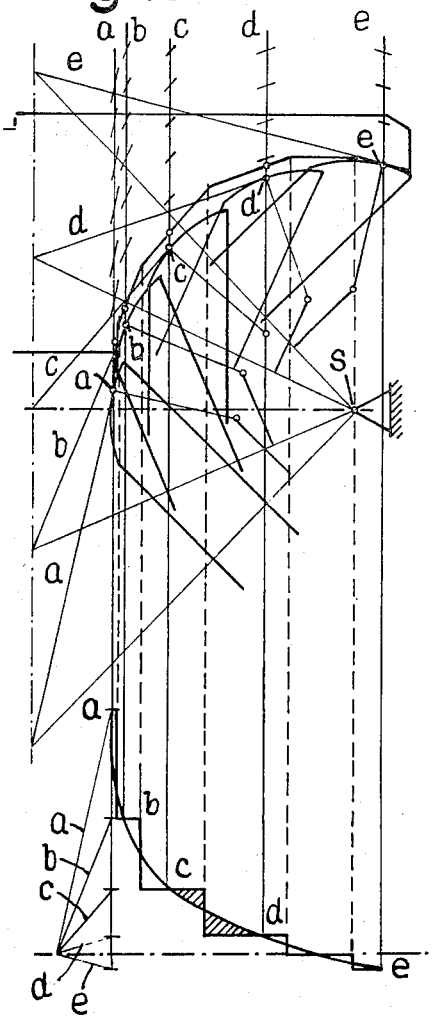

Feb. 14, 1956  G. STRECKER  2,734,389
CHANGE SPEED GEAR OF THE ADJUSTABLE ROTARY ROLLER TYPE
Filed Dec. 29, 1949  4 Sheets-Sheet 4

INVENTOR:
GERALD STRECKER
By Wenderoth, Lind
& Ponack
ATTORNEYS

United States Patent Office 2,734,389
Patented Feb. 14, 1956

2,734,389

CHANGE SPEED GEAR OF THE ADJUSTABLE ROTARY ROLLER TYPE

Gerald Strecker, Darmstadt-Eberstadt, Germany

Application December 29, 1949, Serial No. 135,553

Claims priority, application Switzerland January 3, 1949

3 Claims. (Cl. 74—200)

The present invention relates to a change speed gear of the adjustable rotary roller type, i. e. a change speed gear operating through friction and adapted to provide a gradual modification in speed. Such a change speed gear includes in principle two drums or bevel friction wheels arranged coaxially with one another and serving respectively as a driving and as a driven wheel, said wheels being associated with disks or transmission rollers engaging them, which disks or rollers assume an adjustable position in accordance with the speed reduction desired and are rotatably arranged between the friction wheels. The friction wheels and transmission rollers assume the shape of bodies of revolution, the peripheral surface of which is generated in principle by a curve. The bevel friction wheels or drums are bounded by concave walls, the generating lines of which will be termed hereinafter the definition track, while, in contradistinction, the transmission rollers or disks appear under the form of convex bodies, the generating line of which is designated hereinafter as the transmission track.

More particularly the present invention relates to a variable speed frictional gearing having two cone shaped drums mounted on aligned axes and having their smaller ends adjacent and their working faces concaved, and a disk or disks with convex working faces contacting both said drums, the axis of said disk or disks being tiltable in an axial plane of said drums, said drums and disks consisting of relatively hard material and the radius of curvature of the disk face being smaller than that of the drum face to provide a substantially point contact therebetween. By "substantially point contact" is meant a contact between the two friction wheels which though theoretically a point contact is actually more or less a spot contact. This does not mean, however, a broad contact as obtained when one of the friction wheels is made of relatively soft material as for instance rubber or fiber, or when the radius of curvature on both contacting wheels is the same.

The object of the present invention is to improve a gearing of the kind stated.

Another object of the invention is to provide true rolling contact between the cooperating friction wheels for any position of the disk or disks.

Another object is to minimize wear and tear of the friction wheels.

Another object is to increase the efficiency of the gearing.

Still another object is to equalize wear and tear of the disk or disks.

Further objects will be apparent from the following description of a few embodiments of the invention as well as from the accompanying drawings in which—

Fig. 9 illustrates in diagrammatic cross section a gearing with axially movable drums or bevel wheels;

Fig. 10 illustrates the designing of the drum face or definition track of the gear represented in Fig. 9.

Figure 5:
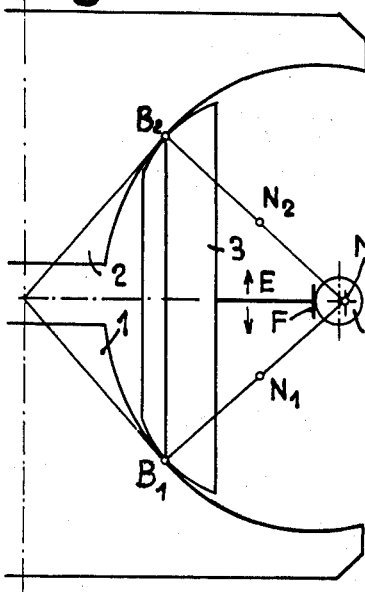
Figs. 5 and 6 illustrate in diagrammatic cross section a gearing with drums or bevel friction wheels axially non-movable.
Figure 6:
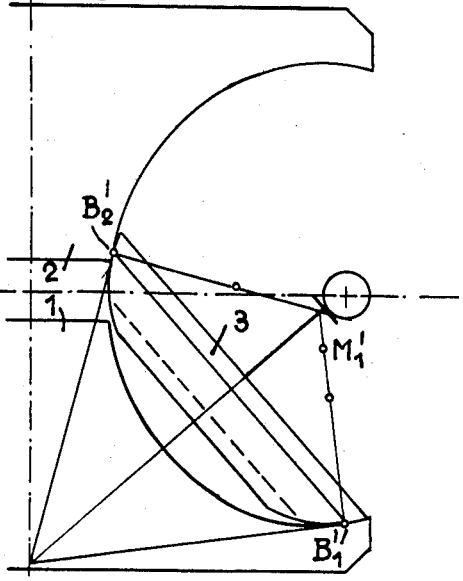

In Figs. 5 and 6 the rotatable but axially non-movable bevel wheels or drums are designated 1 and 2 respectively, one transmission roller or disk 3. The face of the disk, i. e. the transmission track, is part of a circle around the center $N_1$ or $N_2$ respectively; the drum face is not a circle but of a more complex nature. The tangents in the points where the drums and disk contact, e. g. in the points $B_1'$ and $B_2'$ in Fig. 6, intersect at the intersection of the axes of the drums and the disk, for any position of the disk, as represented. The exact configuration of the drum, i. e. the definition track, can be drafted with an instrument as illustrated in Figs. 7 and 8 or calculated by analytical methods.

The disk can be tilted from the middle position shown in Fig. 5 into a position like the one represented in Fig. 6. This is accomplished by control means not shown in the drawing. In addition to that, means are provided to allow the axis round which the disk 3 freely revolves to shift in a direction perpendicular to itself, i. e. for instance in the direction shown by the double arrow E in Fig. 5. This can be accomplished by providing a plane surface F rigid with the disk axis, adapted to roll along the surface of a carrier shaft or spindle S journalled in bearings (not shown) which are rigid with the gear housing. Means are provided to ensure that the disk axis remains parallel to itself while the surface F rolls along the shaft or spindle S. Other means to allow this shifting are described in connection with Fig. 11.

Figure 11:
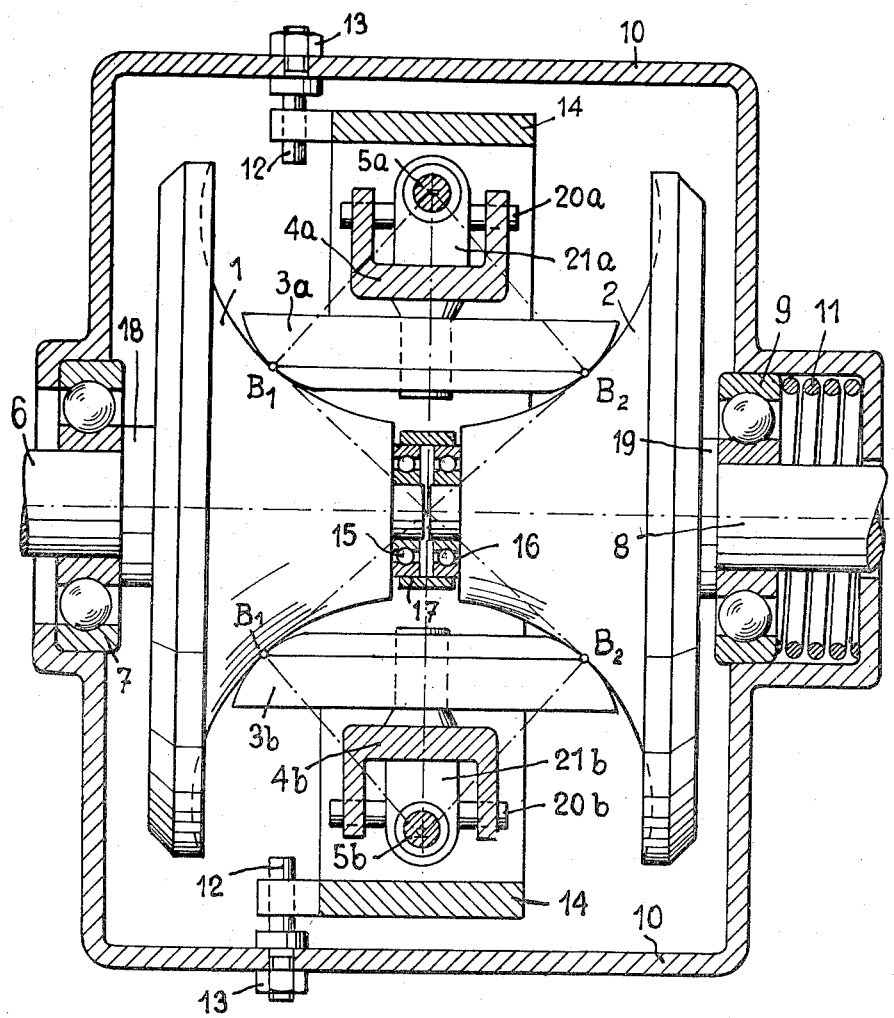
Fig. 11 is a diagrammatic cross section of a practical embodiment of the arrangement according to Figs. 5 and 6.

The center of the axis of the spindle S is located in the center of a circle replacing the drum face or definition track with the best possible accuracy. This center can be found on the drawing board by the trial and error method. This center is not, as in known gearings, the intersection M (Fig. 5) of the perpendiculars to the tangents in the points of contact for the middle position of the disk, but somewhat nearer to the drum axis as represented in Figs. 5 and 11.

Figure 1:
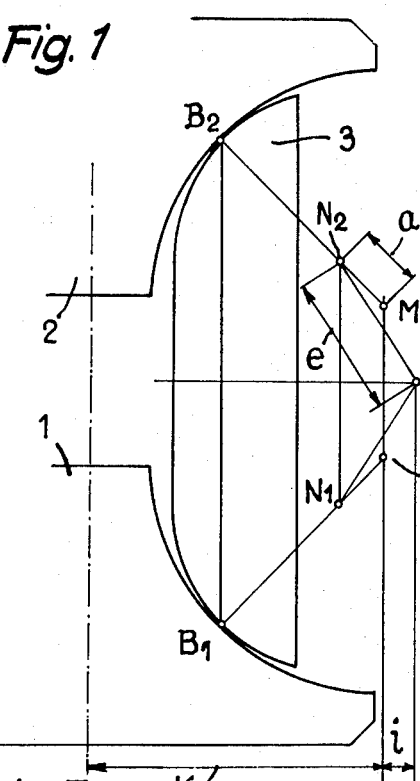
Figs. 1 and 2 illustrate a gear in which the roller or disk acts as a supplementary speed reducing transmission when positioned away from its mean position.
Figure 2:
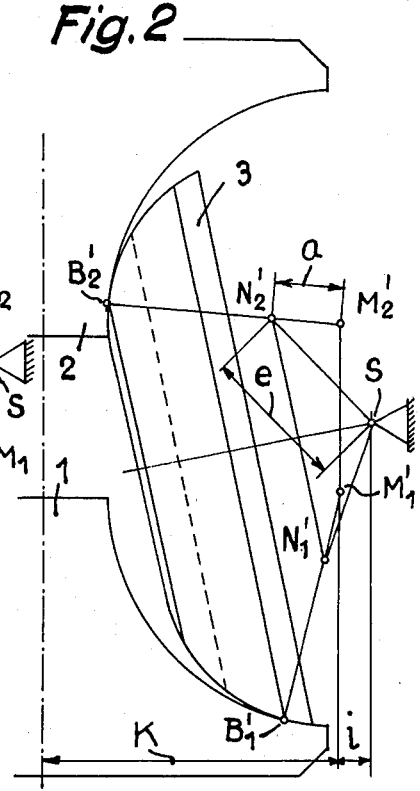
Figure 7:
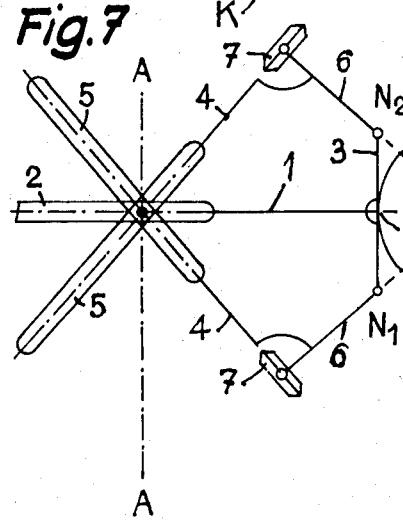
Figs. 7 and 8 show a view of an instrument for designing and drawing the drum face or definition track of the gearing represented in Figs. 5 and 6 and in Fig. 11.
Figure 8:
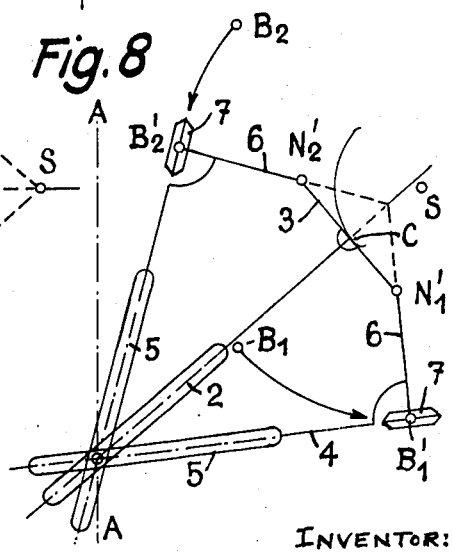
Figure 3:
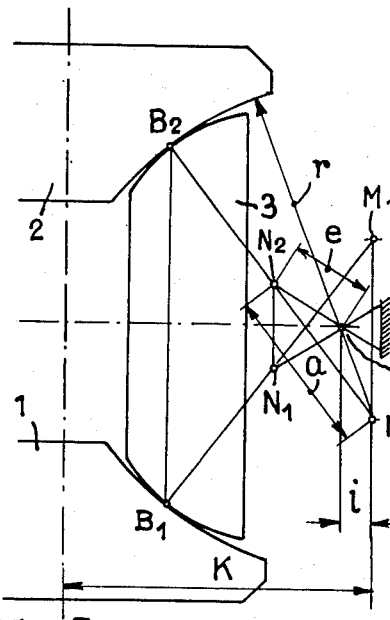
Figs. 3 and 4 illustrate a gear in which the roller or disk acts as a complementary transmission when positioned away from its main position.
Figure 4:
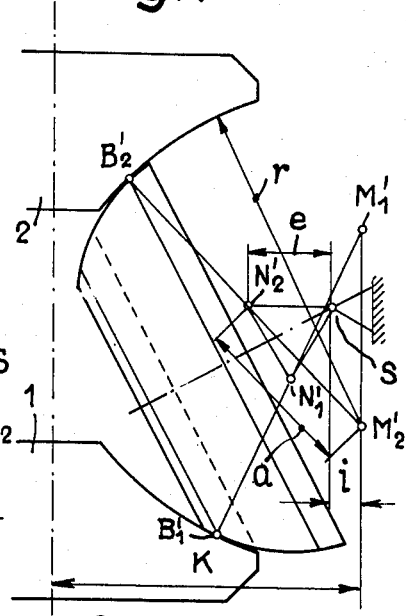

Figs. 7 and 8 illustrate a drawing instrument of the planimeter type providing for the drawing of the definition track of an arrangement according to Figs. 5 and 6. The rods 1 and 3 are rigid with one another and the rod 1 carries at its end a fork 2; two similar pairs of rods 4 and 6 rigid with one another and perpendicular to one another are also provided; the rods 4 and 6 of each pair carry at their intersection a freely revoluble planimetric roller 7 having a sharp edge. The rods 4 carry forks 5 adapted to cooperate with one another and with the fork 2. At the points N1 and N2, the rod 3 is pivotally secured to the corresponding rod 6. The planimeter rollers may be inked with printing ink fed by inking rollers not illustrated, whereby it is possible to draw their path on the drawing paper laid underneath them. Now if a pencil held in the forks 2 and 5 is caused to move along a line AA corresponding to the principal axis of the transmission gear in the plane of the drawing, the roller 7 will draw the track appearing in Fig. 8 as shown at B1—B'1 or B2—B'2 so as to provide accurately the desired curve for the definition track. The intersection C between the rods 1 and 3 describes simultaneously the path illustrated in Figs. 7 and 8. Theoretically the disc axis should be moved along this curve by cam means. The curve obtained for the definition track has a strong resemblance to a cycloid and has in common with the latter the property of approximating closely the arc of a circle over a comparatively considerable length. This property may be made use of as concerns the shifting described hereinabove of the roller axis with its direction unchanged with reference to the axis of a carrier shaft that is stationary in space. The axis of the carrier shaft S in Fig. 5 lies somewhat nearer the main shaft than the center of curvature of the middle position and it lies in fact at the center of the arc of a circle substituted for the above cycloid. Inside a shifting angle of about 45°, it is possible to use without any further difficulty this substitute arc. The practical execution may be provided by causing a flat bearing surface carried at the end of the roller axis as described hereinabove to roll in contacting relationship over the surface of the freely rotating carrier shaft S, or again as in the case of Fig. 11 disclosed hereinafter, it is possible to use two plane surfaces moving over one another.

Another method for exactly drawing the definition track is illustrated in Figs. 9 and 10. In contradistinction with Figs. 7 and 8, the axis of rotation of the transmission roller is supposed to be capable of rocking round the stationary point S without any shifting of the roller remaining parallel to its original position. The outline of the definition track is thus obtained as follows: for the different positions between $a$ and $o$ of the transmission roller, the tangents to said roller are drawn, taking into account the conditions disclosed that govern a pure rolling movement and these tangents are to pass consequently through the intersection between the axes of the two parts rolling over one another. It is thus possible to obtain, starting from the tangents and through integration, the surfaces enveloping the desired outline. The integration is made in the present case graphically and, furthermore, in order to obtain an improved basis for the drawing of the curve, the field of isocline lines is also drawn. The curve obtained has a certain apparent similarity with that of Figs. 5 and 6 although it corresponds to a different mathematical function. The increase of the curvature from the inner end to the outer end is obtained more speedily. In the case disclosed just above, the bevel wheels 1 and 2 are to be shifted axially to allow adjustment.

The possibilities of drawing the generating lines of the bevel friction wheels are by no means exhausted by the examples given hereinabove. In the first place, it is possible to execute both methods not only graphically but also and as well analytically. The curves described and illustrated for the transmission surfaces of the friction wheels are only a few of the numerous curves that may be obtained in conformity with the principle of the invention. In particular, the transmission track may differ from circularity and assume for instance the shape of a curve with a variable curvature. This possibility has an important action on the shape of the definition track.

Fig. 11 illustrates diagrammatically an arrangement wherein the definition and transmission tracks correspond to those of Figs. 5 and 6. Consequently an arrangement operating with a pure rolling motion and having a wide field of adjustment is by no means more complicated in its structure than the usual prior arrangements of the rotary roller type.

The bevel wheels 1 and 2 of the arrangement of Fig. 11 are carried by the shaft 6 and 8 through the agency of the main bearings 7 and 9 inside a casing 10. To said shafts are secured furthermore spacing rings 18 and 19 for defining the accurate position of the wheels 1 and 2 with reference to the transmission roller; lastly, a thrust spring 11 produces the operative pressure that may be replaced by a proportional pressure of any description or may be associated with such a proportional pressure.

The axes 5a and 5b round which the rollers are angularly shifted are mounted in a pressure balancing frame 14 held by bolts 12 and nut 13 perpendicularly to the main axis of the arrangement, whereby said pressure-balancing frame 14 is allowed to slide perpendicularly to said main axis inside the casing 10. The straps 4a and 4b associated with the axes of rotation of the transmission rollers 3a and 3b for carrying the latter are adapted to slide with reference to shoes 21a carried by the shifting axes 5a and 5b. The rods rigid with the shoes and illustrated at 20a and 20b prevent them from dropping off. At the center of the arrangement are provided the thrust bearings 15 and 16 connected with one another through the support 17 and carrying the bevel wheels 1 and 2. The constructional difficulties correspond to those of prior arrangements with the advantage however of a pure rolling motion and of a uniform wear of the transmission roller.

By reason of the pure rolling obtained, it is possible to increase considerably the application of the parts against one another in the plane of the drawing, in particular as in the case of the recent cask-shaped or annularly grooved supports. It is possible thus to obtain a pressure ellipse that is elongated and has a very long major axis. This allows increasing to a considerable extent the load capacity of the contacting surfaces. It is thus possible to select a unitary pressure that is smaller, in other words to give up the hardening of the rolling surface. By reason of the cutting out of the evolution of heat and of the heat sensitivity of hardened surfaces, it is possible to give up the use of a cooling oil bath. The arrangement that rotates under dry conditions (the specific lubrication and fluidtightness provided for the main bearings has not been illustrated in the drawings) has a frictional coefficient that is substantially higher and is not substantially reduced when the peripheral speed increases. The improved frictional conditions allow a higher speed of rotation of the arrangement and also the execution of more powerful systems and the obtention of higher efficiencies for given sizes of the parts and at the same time it is possible to increase to a considerable extent the power that may be transmitted and the speed of rotation that may be used.

What I claim is:

1. In a variable speed frictional gearing, two cone shaped drums mounted on aligned axes and having their smaller ends adjacent and their working faces non-circularly concaved, a disk with a convex working face contacting both said drums, the axis of said disk being tiltable in an axial plane of said drums, said drums and said disk consisting of relatively hard material and the radius of curvature of the disk face being smaller than that of the drum face to provide a substantially point contact therebetween, and the drum face being of such a shape to ensure that tangents in the points of contact to the faces of said disk and drums intersect at the intersection of the axes of said disk and drum for any position of the disk.

2. In a variable speed frictional gearing, two cone shaped drums rotatably but axially not shiftably mounted on aligned axes and having their smaller ends adjacent and their working faces non-circularly concaved, a disk with a convex working face contacting both said drums, the axis of said disk being tiltable in an axial plane of said drums about the center of a replacing circle for said drum face and to a small extent shiftable perpendicular to itself, and the radius of curvature of the disk face being smaller than that of the drum face and said disk and drums consisting of relatively hard material to provide a substantially point contact therebetween.

3. In a variable speed frictional gearing, two cone shaped drums rotatably but axially non-shiftably mounted on aligned axes and having their smaller ends adjacent and their working faces non-circularly concaved, a disk with a convex working face contacting both said drums, the axis of said disk being tiltable in an axial plane of said drums, the radius of curvature of the disk face being smaller than that of the drum face and said disk and drums consisting of relatively hard material to provide a substantially point contact therebetween, and cam means associated with said disk for movement of said disk along a curved line.

References Cited in the file of this patent

UNITED STATES PATENTS

| 1,262,467 | Dorman | Apr. 9, 1918 |
| 2,079,681 | Chilton | May 11, 1937 |
| 2,272,509 | Cavallo | Feb. 10, 1942 |
| 2,353,448 | Edlich | July 11, 1944 |
| 2,412,351 | Mount | Dec. 10, 1946 |

FOREIGN PATENTS

| 525,868 | France | June 16, 1921 |
| 476,589 | Great Britain | Dec. 13, 1937 |